United States Patent Office 3,382,429
Patented May 7, 1968

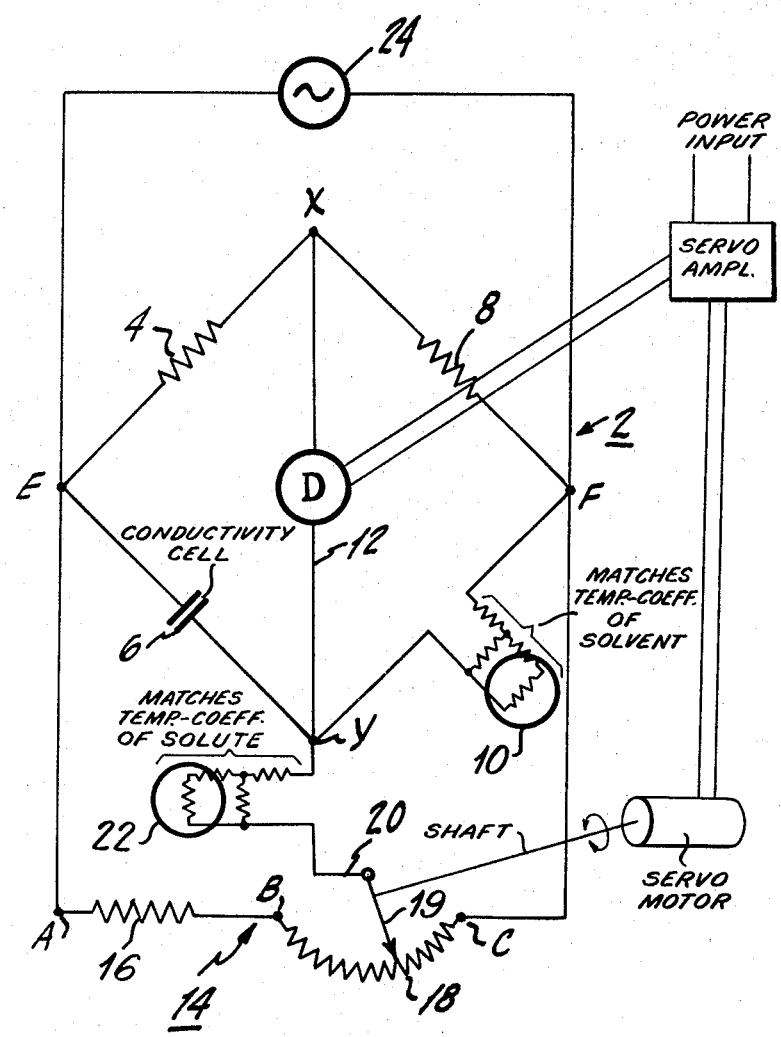

3,382,429
METHOD OF AND APPARATUS UTILIZING
BRIDGE FOR MEASURING CONDUCTIVITY
Elmer A. Sperry III, Pompton Plains, N.J., assignor to Industrial Instruments, Inc., Cedar Grove, N.J., a corporation of New Jersey
Filed June 2, 1965, Ser. No. 460,765
6 Claims. (Cl. 324—30)

ABSTRACT OF THE DISCLOSURE

The invention comprises an improved method of and apparatus for measuring electrical conductivity of the solute portion of ionic solutions wherein provision is automatically made for compensation of the effects of solvent conductivity and for changes in conductivity of both solvent and solute due to changes in solution temperature. The apparatus utilizes a bridge across one diagonal of which a source of low voltage is connected and across the other diagonal of which a detector is connected. A conductivity cell is connected in one arm of the bridge and a temperature sensitive element with a resistor network having a temperature coefficient of resistance substantially the same as that of the solvent is connected in the corresponding arm of the bridge. Another temperature sensitive element with its associated resistor network having a temperature coefficient of resistance substantially the same as that of the solute is connected to one terminal of said other diagonal.

---

This invention relates to an improved method of and apparatus for measuring electrical conductivity and, more particularly, to measuring electrical conductivity of the solute portion of a solution with automatic compensation for the conductivity of the solvent and additional automatic compensation for changes in the conductivities of both solvent and solute with changes of temperature.

Electrolytic conductivity methods have previously been widely used for quantitative analysis of ionic solutions to determine their solute content. As compared to standard gravimetric and colorimetric methods, for example, electrolytic conductivity methods offer advantages of speed, reliability and the use of apparatus which can be operated by relatively unskilled personnel. However, difficulties arise in these previously used electrolytic conductivity methods when dilute solutions are to be analyzed. This is due to the fact that previously used methods lump together solute and solvent conductivities and do not take into separate consideration the individual conductivities of the solvent and solute. Most commonly used solvents, such as water, have extremely low conductivities in the pure state because their ionization constants are very low. The ionization constants are, in fact, so low that if there is a substantial amount of solute present, the conductivity of the solvent may be neglected. But, when dilute soltuions are being analyzed, the conductivity of the solvent becomes an appreciable fraction of the total conductivity and, in order for accurate results to be obtained, this conductivity must be taken into consideration.

Another factor that must be considered in electrolytic methods of measuring solute content, is the change in conductivity of both solvent and ionized solute with change of temperature. The conductivities of most solvents and of most ionized solutes change appreciably with change of temperature and each substance has its own particular temperature-conductivity coefficient. Of course, one way to eliminate the effects of temperature changes in electrolytic methods of analysis is to provide apparatus for maintaining the temperature constant. But this introduces thermostats and other temperature controls which may add considerably to the cost of apparatus and maintainance and limit the usefulness of the method in pipelines, tanks, and the like.

An object of the present invention is to provide an improved method of and apparatus for measuring electrical conductivity of the solute portion of ionic solutions wherein provision is automatically made for compensation of the effects of solvent conductivity and for changes in conductivity of both solvent and solute due to changes in solution temperature.

Another object of the invention is to provide apparatus for measuring the electrical conductivity of the solute portion of ionic solutions, in which no errors are introduced because of temperature changes of the solution that normally occur during the measuring process.

A further object of the invention is to provide improved electrolytic conductivity measuring apparatus that lends itself readily to accurate and rapid analysis of dilute solutions.

The invention will be more readily understood and further objects and advantages will be apparent from the following detailed description with reference to the drawing, the single figure of which is a schematic view of a simple A-C bridge circuit which includes a conductivity cell and indicator means for obtaining an indication of the conductivity of the solute portion of a solution.

Referring now to the drawing, the measuring apparatus of the present invention comprises a bridge circuit 2, one-half of which comprises a resistance arm 4 and a standard conductvity cell 6 which may, for example, have electrodes coated with platinized platinum and have a cell constant of 0.01 cm.$^{-1}$. The other half of the circuit comprises a resistor 8 and temperature sensitive resistor or element 10. The element 10 should be so selected that it has the same temperature coefficient of resistance as the pure solvent which is to be used in the conductivity cell 6. The resistor or element 10 should be maintained at the same temperature as the conductivity cell 6. A practical way to accomplish this is to immerse it in the solution being measured, as close to the conductivity cell as practically possible. Since the element 10 should also be electrically insulated from the liquid, it should be encased in a tube of insulating material such as glass. Instead of being a resistor, the temperature sensitive element 10 is most often a thermistor connected to a resistor network (not shown) for modifying the response characteristics of the temperature-sensing element. Element 10 may also be a sealed reference cell containing portions of solvent or standard solution and electrode similar to the measuring cell.

The resistor 4 and the conductivity cell 6 are electrically connected together at the terminal point E. The resistors 8 and 10 are electrically connected together at the terminal F. The terminals E and F constitute a diagonal of the bridge circuit. The bridge circuit 2 also includes a common branch 12 in which is connected a detector D. The detector may be an A-C galvanometer or an oscilloscope, for example or, as described later, part of a servo system including a motor. The terminals X and Y of common branch 12 consistute another diagonal of the bridge.

Also included in the circuit is a resistor 14 connected across the points E and F. This resistor has opposite ends A and C and midpoint B. The resistor 14 may be in the form of a slide-wire potentiometer for the bridge circuit and is composed of two halves 16 and 18 each of which terminates at the midpoint B. A connection means 20 has one end electrically connected to the point Y between the bridge circuit arms 6 and 10 and makes sliding contact with the resistance half 18 by means of slider 19.

Included in the connection means 20 is a temperature-sensitive resistor element 22. This element is selected to have the same temperature coefficient of resistance as the ionized solute being measured and, like resistor 10, is encased in glass so that it can be immersed in the solution being measured. The element 22 may also be a thermistor connected to a resistor network (not shown).

The values of the various resistances should be so chosen that the resistance ratios of 4:8, 6:10, and 16:18 are equal. The value of resistance 22 should also be chosen so that it is large in relation to the resistance of resistor arm 18.

To supply measuring current to the apparatus, a low voltage A-C oscillator 24 is connected across the circuit points E and F which constitute one of the diagonals of the bridge. A voltage of the order of 10 volts, supplied by a stable oscillator operating in the frequency range of 50 c.p.s. to 10,000 c.p.s. may conveniently be used. If the voltage is too low, the sensitivity of the apparatus will be too low, and, if the voltage is too high across the conductivity cell, the cell may heat up causing errors in measurement. It is preferable that only a fraction of a volt appears across the conductivity cell and thermistors.

The apparatus may be used as follows to measure the conductivity of the solute portion of a solution. For ultra-pure water and a cell constant of 0.01 cm.$^{-1}$, at 25° C., the theoretical resistance of the conductivity cell is 180,000 ohms. The temperature-sensitive resistor 10 may then also have a value of 180,000 omhs. if it is desired to maintain the resistance ratios of the various opposing circuit arms at unity. With the slider of the connection means 20 set at the midpoint B of the resistor 14, the circuit is balanced and no current flows through the common circuit arm 12. Thus, the detector D will read zero current flow and the points X, Y and B are all at the same potential. If the temperature of the solvent varies, the bridge will remain in balance since the resistor element 10 is selected to have the same temperature coefficient of resistance as the solvent.

If, in this example, the solute which is to be added to the solvent is sodium chloride, and it is known that the maximum amount of solute desired to be measured will provide a solute conductivity of 1 micromho/cm. at 25° C., the minimum resistance measured by the conductivity cell will be 9470 ohms at 25° C. This follows from the fact that, in a solution containing solvent and solute, each phase of the system contributes its own conductivity independently, and the solution acts as though it consisted of two resistances in parallel. In a cell having a constant of 0.01 cm.$^{-1}$ a solute having a conductivity of 1 micromho/cm. has a theoretical resistance of 10,000 ohms.

Under this condition, the value of the temperature-sensitive resistor 22 should also be selected to be 10,000 ohms and to have the same temperature coefficient as sodium chloride. The values of each of the arms 16 and 18 of the resistor 14 may be 100 ohms.

If an amount of solute is added to the solvent the bridge will become unbalanced as indicated by a current reading on D. To restore balance to the bridge circuit and take the reading on D back to zero, the slider 19 of connection means 20 is moved either manually or through a servo system as indicated in the drawing, toward the point C, until balance is restored. This new balance will not be disturbed by changes in temperature since element 10 will compensate for temperature changes of resistance of the solvent, as before, and element 22 will now compensate for temperature changes of the solute.

If the resistance element 18 is linear, then equal arm movements will render equal resistance changes, and displacement of the slider 19 will be directly proportional to solute conductivity.

Under the conditions specified above, a full scale reading on the resistor arm 18 indicates a solute conductivity of 1 micromho/cm. at 25° C. and any reading less than full scale indicates a proportionately lower conductivity. Since the solvent conductivity remains essentially constant, resistance 18 may be calibrated to read out also in solution conductivity by using an appropriate scale. Calibrations in ohm-centimeters and concentrations, such as parts-per-million, grams-per-gallon, etc., are easily had by simply selecting the proper scale distribution, etc.

If the conditions of the example are changed so that the maximum conductivity to be measured is 2 micromhos/cm. the minimum resistance in the cell, due to the solute, is 5,000 ohms. The temperature-sensitive element 22 should then also have a resistance of 5,000 ohms, and arms 16 and 18 should each be 50 ohms.

If the maximum conductivity is increased to 4 micromhos/cm., the minimum resistance of the solute in the cell falls to 2,500 ohms and the element 22 should also be 2,500 ohms. Under these conditions it is preferable to increase the cell constant to 0.04 cm.$^{-1}$ so that higher values of resistance may be used in element 22 and so that arms 16 and 18 can be kept at reasonable values.

Thus, for measuring different ranges of solute conductivity, other resistance values can be substituted in the temperature-sensitive resistance element 22 and for measuring the conductivity of different solutes other resistance materials can be used in the element 22, it being merely necessary to match the temperature coefficient of resistance of the solute.

Also, if different solvents are used, the temperature-sensitive element 10 is changed to match the temperature coefficient of the solvent. Likewise a change in cell constant of conductivity cell 6 requires a corresponding change in the other bridge arms 4, 8, and 10 as well as in resistors 16 and 18.

For a water-sodium chloride solution, both temperature-sensitive elements 22 and 10 will be semiconductor devices with large negative temperature coefficients modified by resistive networks to have coefficients equal to a sodium chloride solution for 22 and equal to pure water for 10. These semiconductor devices are generally called thermistors. They are mixtures of various oxides, etc. which are fired in an electric furnace to form a ceramic material which is then cut to size and otherwise prepared by the addition of conductive coatings and leads to be used as a temperature-sensitive resistor. Other suitable materials are the single crystal semiconductor materials, such as silicon carbide and related substances, as opposed to the ceramic mixtures. These are also called "thermistors." Temperature-sensitive element 22, with the coefficient of sodium chloride, will have a coefficient of about —2% per ° C. resistance change with increasing temperature. The design of a suitable resistor network where a simple series resistor is not employed is well known to those skilled in the art.

What is claimed is:

1. Apparatus for measuring electrical conductivity of a solution, comprising a resistance bridge having first and second pairs of opposite terminals, means to apply an energizing potential to said first pair of opposite terminals, bridge balance indicator means connected to said second pair of opposite terminals, a conductivity cell connected into one arm of said bridge, a temperature-responsive resistor connected in a corresponding arm of said bridge, resistors in the other arms of said bridge, said temperature-sensitive resistor having the same temperature coefficient of resistance as that of the solvent in the solution being measured, a potentiometer connected across said first pair of opposite terminals, a sliding connector in a connection from said potentiometer to one terminal of said second pair of opposite terminals, said connection including a second temperature-sensitive resistor the temperature coefficient of resistance of which is the same as that of the ionized solute of the solution being measured.

2. Apparatus according to claim 1 including a servo system connected between said bridge balance indicator means and said sliding connector to automatically move said sliding connector to restore bridge balance in response to current flowing in said indicator means.

3. Apparatus for measuring electrical conductivity of a solution, comprising a bridge circuit having four arms, first and second ones of said arms being resistors directly connected together, a third one of said arms having a conductivity cell connected therein, and the fourth one of said arms comprising a combination of a resistive network and a first temperature-sensitive element, a source of alternating current connected across one diagonal of said bridge, a current detector connected across the other diagonal of said bridge, a potentiometer including a slide wire connected across said first diagonal, a connection between said slide wire and one terminal of said second diagonal, said connection making sliding contact to said slide wire and including therein a combination of a second resistance network and a second temperature-sensitive resistance element, said second network and element combination having the same temperature coefficient of resistance as the ionized solute being measured, and said first network and element combination having the same temperature coefficient of resistance as that of the solvent being measured.

4. Apparatus for measuring electrical conductivity of a solution, comprising a bridge circuit having four arms, first and second ones of said arms being resistors directly connected to each other, third and fourth ones of said arms also being directly connected together, said third and fourth arms comprising a conductivity cell and a temperature-sensitive resistance element respectively, that end of said cell which is remote from said element being connected to one end of said first arm, while that end of said element which is remote from said cell being connected to said second arm, the junction points between said first and second arms and between said cell and said element constituting a first diagonal of said bridge, and the junction points between said cell and said first arm and between said element and said second arm constituting the second diagonal of said bridge, a current detecting means connected across said first diagonal, a source of alternating current being connected across said second diagonal, a slide wire potentiometer also connected across said second diagonal, connection means having one end connected to one terminal of said first diagonal and having a second end making slide contact to said slide wire, said connection means including a second temperature-sensitive resistance element having the same temperature coefficient of resistance as that of the ionized solute being measured, and said first temperature-sensitive element having the same temperature coefficient of resistance as that of said solvent being measured.

5. The method of measuring the conductivity due to addition of a solute to a solvent, by means of an alternating current bridge having in one arm thereof a conductivity cell immersed in said solvent, which comprises balancing said bridge in the absence of said solute while compensating for any change in the resistance of said solvent resulting from a temperature change which is related to a predetermined temperature, introducing said solute into said solvent which thereby unbalances said bridge, rebalancing said bridge by adjusting the current flow therein while compensating for any change in resistance of said solute resulting from any temperature change thereof, and obtaining an indication of the degree of adjustment required to rebalance said bridge.

6. The method of measuring the conductivity due to addition of a solute to a solvent, by means of an alternating current bridge having in one arm thereof a conductivity cell immersed in said solvent, which comprises balancing said bridge in the absence of said solute while compensating for any change in the resistance of said solvent resulting from a temperature change thereof which is related to a predetermined temperature, introducing said solute into said solvent which thereby unbalances said bridge, regulating the current flow in said bridge to obtain a rebalance thereof while compensating for any change in temperature of said solute which is related to said predetermined temperature, and obtaining an indication of the magnitude of said regulation.

References Cited

UNITED STATES PATENTS

| 2,899,636 | 8/1959 | Rubricius | 324—30 |
| 3,182,252 | 5/1965 | Van den Berg | 324—30 |

RUDOLPH V. ROLINEC, *Primary Examiner.*

C. F. ROBERTS, *Assistant Examiner.*